UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

ORANGE AZO DYE.

SPECIFICATION forming part of Letters Patent No. 497,032, dated May 9, 1893.

Application filed October 24, 1892. Serial No. 449,820. (Specimens.)

*To all whom it may concern:*

Be it known that I, CHRISTIAN RUDOLPH, a subject of the German Emperor, residing at Offenbach-on-the-Main, Germany, (assignor to the firm of K. OEHLER, in the said city of Offenbach, Germany,) have invented new and useful Improvements in Orange Azo Dye-Stuffs, of which the following is a specification.

My invention consists in the production of a new azo dye stuff from diazotized toluylendiaminsulfo acid

and beta naphthylamine.

My method of proceeding for the production of this dye stuff is as follows: 10.1 parts by weight of toluylendiaminsulfo acid

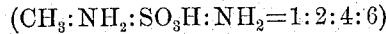

are dissolved in twenty-five parts by weight of soda-lye of eight per cent. and mixed with a solution of 6.9 parts of sodium nitrate in two hundred parts by weight of water cooled with ice. This mixture is slowly poured into forty-three parts of hydrochloric acid of $22\frac{1}{2}°$ Baumé diluted with two hundred parts of water and cooled with ice. As soon as the formation of the diazo body is terminated, the solution is mixed with another solution of eighteen parts of chlorhydrate of beta naphthylamine in one thousand parts of water at a temperature of 0° centigrade. The tetrazo body combines first with one molecule of beta naphthylamine, eliminating hydrochloric acid, forming thus an intermediate body which precipitates as a brown powder. The dye stuff is then formed by first stirring for some hours, adding a concentrated solution of seventy parts of sodium-acetate; the color of the precipitate is little altered by this; but by further adding a solution of thirty parts of soda and heating to the boiling point, the precipitate is partly dissolved and takes a red color. The dye stuff is precipitated with common salt, filtered, pressed and dried. It forms a red powder soluble in hot water with a yellow red color. Hydrochloric acid produces a brown precipitate and concentrated sulphuric acid dissolves it with a blue gray color. It is especially fit for dyeing cotton directly orange.

What I claim as my invention, and desire to secure by Letters Patent, is—

1. The method of producing a new orange azo dye stuff by reacting on diazotized toluylendiaminsulfo acid with beta naphthylamine, and separating the dye substantially as set forth.

2. As a new article of manufacture, the azo dye stuff herein described derived from beta naphthylamine and toluylendiaminsulfo acid which is a red powder dyeing cotton directly orange, dissolving in hot water with a yellow red color, and in concentrated sulphuric acid with a blue gray color, and from the watery solution of which a brown precipitate is obtained by hydrochloric acid.

In testimony whereof I have signed my name to this specification in the presence of two subscribing witnesses.

CHRISTIAN RUDOLPH.

Witnesses:
ALVESTO S. HOGUE,
JEAN GRUND.